(No Model.) 2 Sheets—Sheet 1.

E. SLOSSON.
SCRAPER ATTACHMENT FOR WHEEL PLOWS.

No. 332,844. Patented Dec. 22, 1885.

Witnesses

Inventor
Eugene Slosson
By Coburn & Thacher
Attorneys

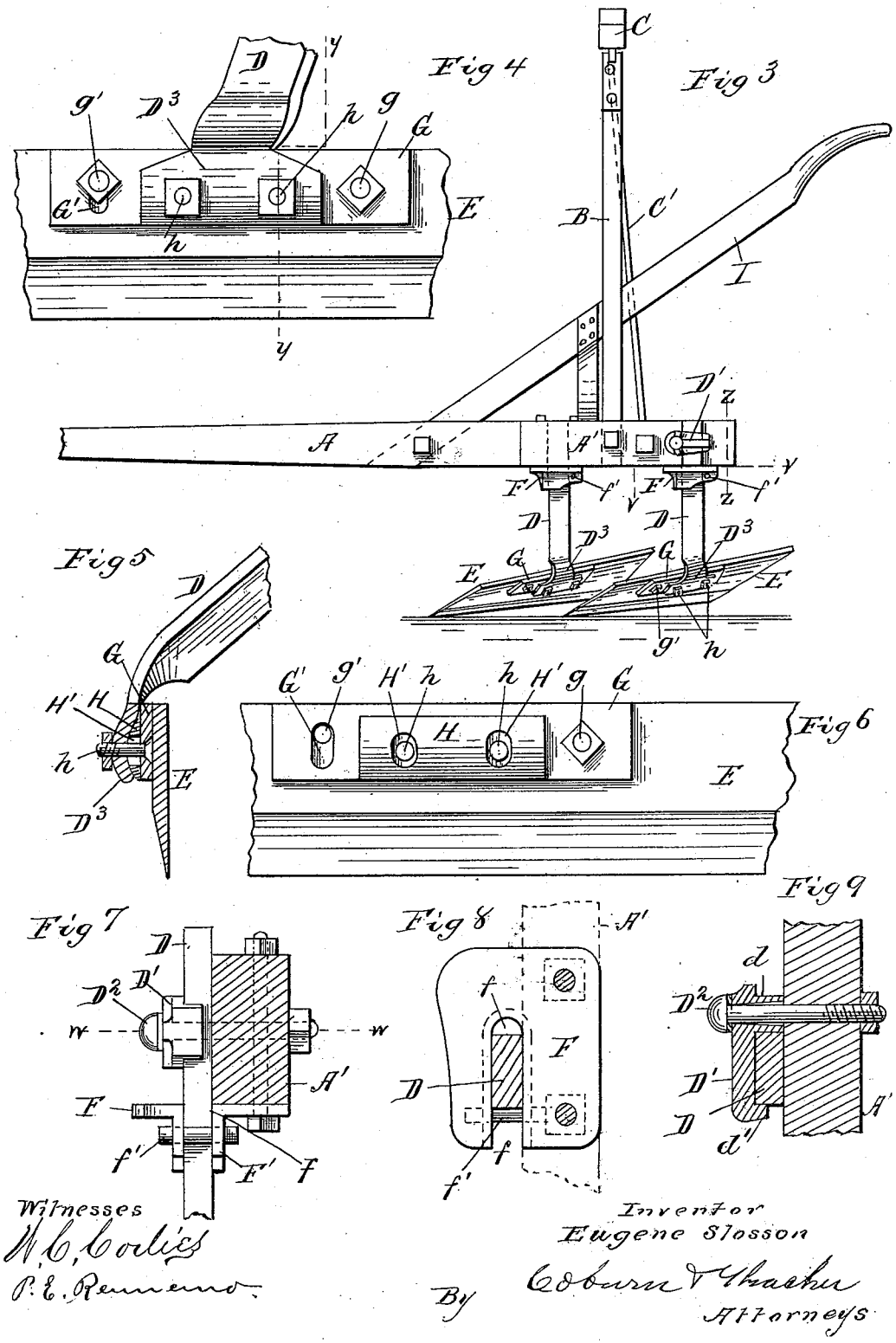

UNITED STATES PATENT OFFICE.

EUGENE SLOSSON, OF VERONA, ILLINOIS.

SCRAPER ATTACHMENT FOR WHEEL-PLOWS.

SPECIFICATION forming part of Letters Patent No. 332,844, dated December 22, 1885.

Application filed February 9, 1885. Serial No. 155,411. (No model.)

*To all whom it may concern:*

Be it known that I, EUGENE SLOSSON, a citizen of the United States, and residing at Verona, in the county of Grundy and State of Illinois, have invented certain new and useful Improvements in Scraper Attachments for Wheel Corn-Plows, which are fully set forth in the following specification, reference being had to the accompanying drawings, in which—

Figure 1:
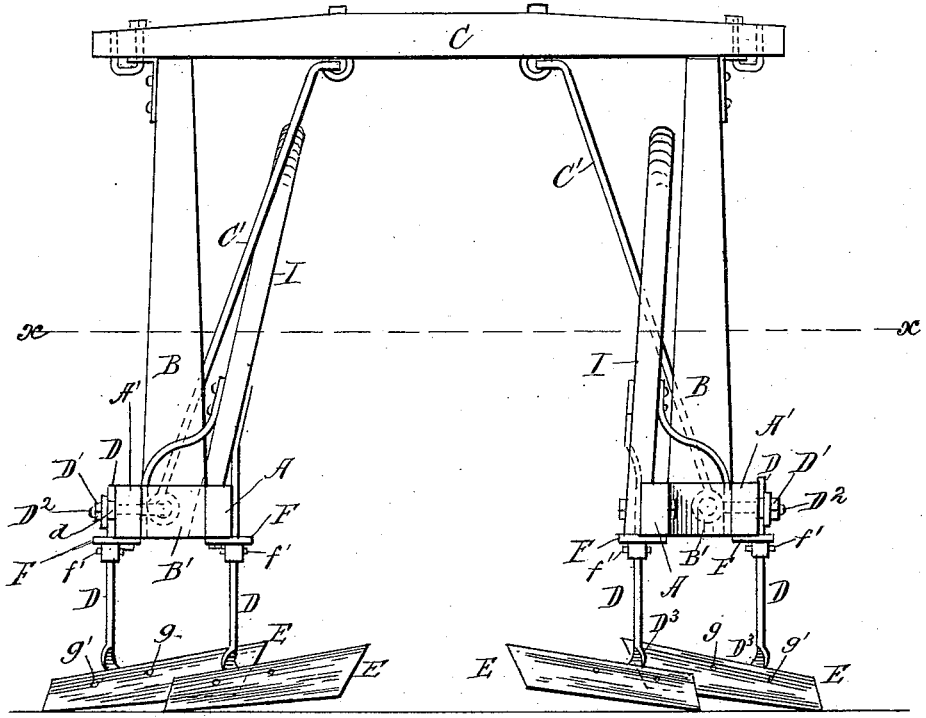
Figure 2:
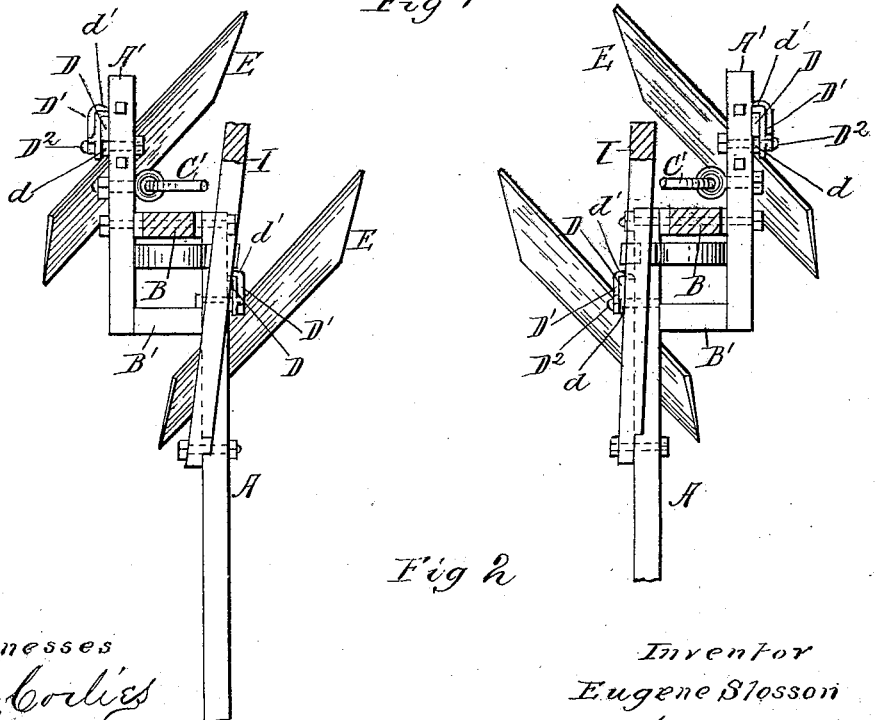

Figure 1 is a front elevation of my improved attachment; Fig. 2, a plan section of the same taken on the line $x\ x$ of Fig. 1; Fig. 3, a side elevation; Fig. 4, a detail plan view of the under side of the scraper and its standard; Fig. 5, a sectional view of the same on the line $y\ y$ of Fig. 4; Fig. 6, a view similar to Fig. 4, the standard being detached; Fig. 7, a sectional view on the line $z\ z$ of Fig. 3, illustrating the manner of attaching the standard to its beam; Fig. 8, a bottom plan view of the parts shown in Fig. 7, and Fig. 9 a sectional view on the line $w\ w$ of Fig. 7. Figs. 1, 2, and 3 are on the same scale, the remaining figures being on a common scale, but on an enlarged scale relatively to Figs. 1, 2, and 3.

Like letters refer to like parts in all the figures of the drawings.

My invention relates to scraper attachments for wheel corn-plows, being in the nature of an improvement on Letters Patent No. 173,565, granted to me February 15, 1876; and it consists in certain novel features, which I will now proceed to describe, and then specifically point out in the claims.

The devices which compose my improved scraper attachment are arranged in duplicate on each side of the implement, and as these two sets are similar in construction, although reversely arranged, I will only describe one set, it being understood that the same description is equally applicable to the other.

The frame-work of each set consists of two parallel or substantially parallel beams, A A', the former extending forward and the latter rearward, and the two being spaced apart by means of the standard B, and a suitable spacing-block, B', and connected by suitable through-bolts. The upper ends of the standards B are hinged, substantially as in my former patent, hereinbefore specified, to an elevated cross-bar, C, braces C' being provided to connect the cross-bar to the beams, as in said patent.

Upon the inner side of the inner beam, A, and upon the outer side of the outer beam, A', I attach, in the manner hereinafter described, the standards D, which carry the scrapers E, and by this means I provide each side of the attachment with two scrapers placed at a suitable distance apart to render their operation most effective. The standards D are preferably attached to the beams in the manner shown in detail in Figs. 7, 8, and 9 of the drawings, in which D' represents a clamping-plate provided with a perforated boss, $d$, of approximately the same thickness as the standard D, and with a lip, $d'$, at the other end, the standard D fitting snugly between the said lip and boss, as shown in Fig. 9 of the drawings.

$D^2$ indicates a clamping-bolt passing through the boss $d$ and through the beam to draw the clamping-plate D' tightly against the standard and clamp this latter against the side of the beam. By means of this device I obviate the necessity of forming perforations through the standard D, which perforations would greatly weaken the standard, and at the same time I am enabled to clamp the standard exactly at any desired height. On the under side of the beam is attached the plate F, projecting laterally beyond the standard, substantially as shown, and provided with a slot, $f$, in this projecting portion of sufficient width to receive the standard D. The lower edge of this slot is surrounded by a dependent flange, F', through perforations in which passes a suitable break-pin, $f'$, of wood or other suitable material, this pin being arranged immediately in the rear of the standard, substantially as shown in Fig. 8. This pin is sufficiently strong to resist the draft-strain under ordinary circumstances; but, in case the scraper strikes an obstruction, will break and allow the standard to swing backward to prevent breakage thereof, the clamping-plate D' turning upon the bolt $D^2$ as a pivot, to allow this backward swing of the standard. In case the pin breaks and the standard swings out of place, the plate F will remain in position and indicate the proper position to which the standard is to be returned. Each scraper-plate is attached to its standard in the manner shown in detail in Figs. 4, 5, and 6 of the drawings. On the rear or under faces of the scraper is attached a plate or bar G, pivoted thereto at one end by means of a bolt $g$, its other end being secured by means of a bolt, $g'$, passing through a slot, G', in the plate G, by reason of which construction the plate G may be set at any desired angle to the scraper within the limits of its adjustment.

Between the plate G and the standard-foot $D^3$ is interposed a second plate, H, one side of which is plane and rests against the plate G, while the other side is curved transversely, in the form of the section of a cylinder, and fits against the correspondingly-curved surface of the standard-foot $D^3$, as shown in Fig. 5. Bolts $h$ connect the plate G with the standard-foot $D^3$, these bolts passing through slots H' in the plate H, as shown.

By adjusting the scraper E relatively to the plate G the front end of the scraper may be set higher or lower, as desired, and by moving the plate H up or down between the plate G and standard-foot $D^3$ the inclination of the plate D, and consequently the scraper E, may be changed to set the scraper in a position more nearly horizontal or vertical, as desired.

It is obvious that the plate G may be dispensed with and the plate H interposed directly between the scraper E and the standard-foot, and I contemplate the use of such a construction under certain circumstances in which it may be found advantageous.

In practice the forward ends of the beams A will be attached to the cultivator-frame by means of the usual couplers which are employed to attach the cultivator-beams, these latter being removed for the purpose.

Handles I are provided to guide the scrapers while in use, one handle being attached to each side of the implement in any approved manner.

It is obvious that various mechanical modifications may be made in the details of construction without departing from the principle of my invention, and I therefore do not wish to be understood as limiting myself strictly to the precise details of construction hereinbefore set forth, and shown in the drawings.

Having thus described my invention, what I claim as new, and desire to secure by Letters Patent, is—

1. The combination, with the two sets of beams A and A', of the standard B and spacing-block B', arranged between each pair of beams, and a cross-beam, C, to which the upper ends of the standards are hinged, substantially as and for the purposes specified.

2. The combination, with the standard B, of the plate F, secured to the beam and projecting laterally therefrom, the said plate being provided with a slot, $f$, at its projecting portion to receive the standard D, and the lower edge of the said slot being surrounded by a flange, F', perforated to receive a suitable break-pin, $f'$, substantially as and for the purposes specified.

3. The combination, with the standard D, of the slotted plate F, secured underneath the beam and having perforated flange F' to receive a suitable break-pin, $f'$, and a clamping-plate arranged on the side of the beam above the said plate F and connected to the beam by means of a single bolt, $D^2$, substantially as and for the purposes specified.

4. The combination, with the scraper E, of plate G, adjustably secured thereon and connected to the standard-foot $D^3$ by means of suitable bolts, $h$, and the plate H, interposed between the plate G and the standard-foot, presenting its flat side to the plate and its curved side to the correspondingly-curved standard-foot, and provided with slots H', through which the connecting-bolts $h$ pass, substantially as and for the purposes specified.

EUGENE SLOSSON.

Witnesses:
RUFUS K. SLOSSON,
EDWIN C. SLOSSON.